UNITED STATES PATENT OFFICE.

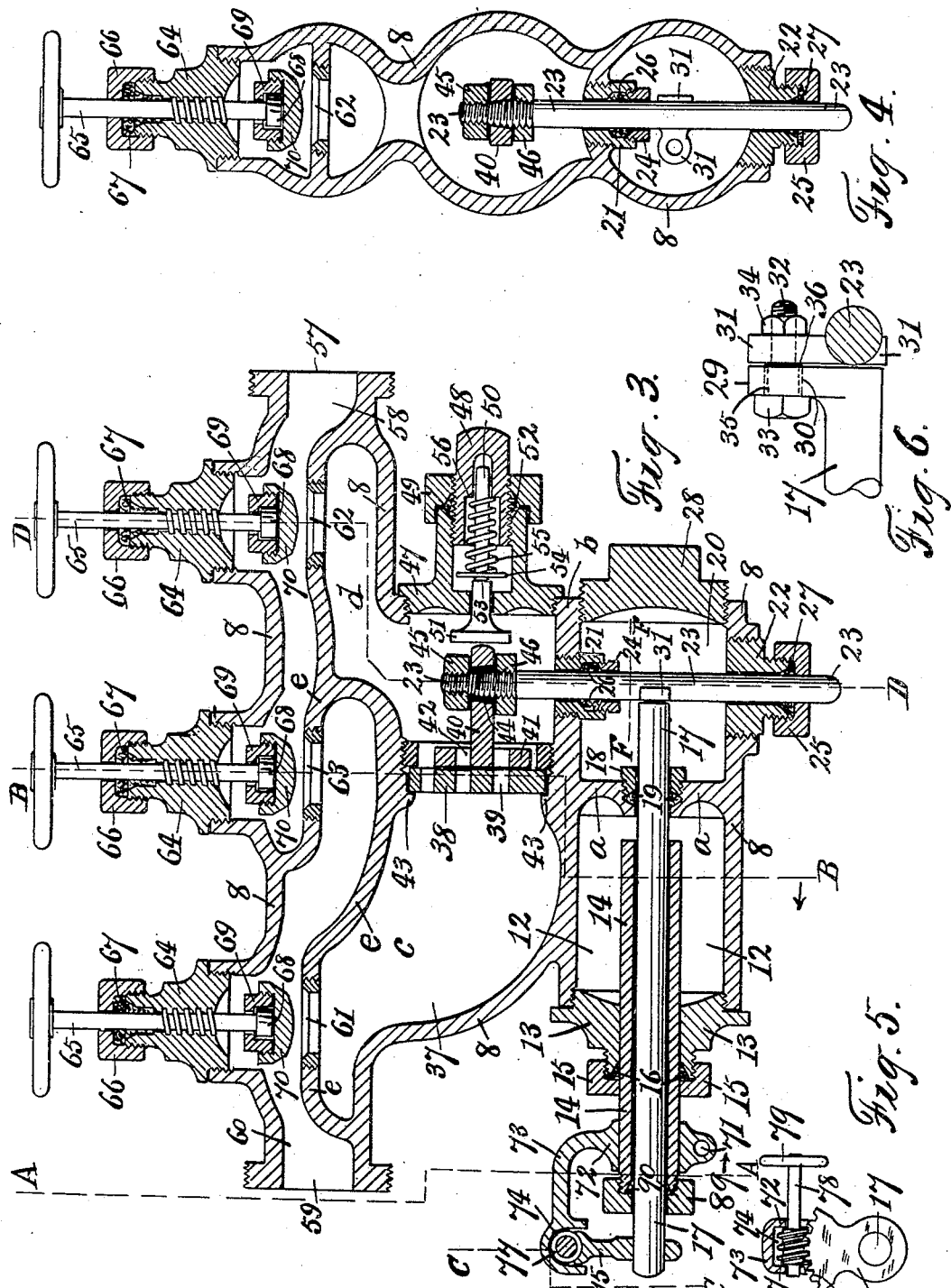

WALTER H. BICE, OF MAPLE LODGE, ONTARIO, CANADA, ASSIGNOR OF ONE-HALF TO ALFRED WESTMAN AND ONE-SIXTH TO WILLIAM R. COLBY, OF LONDON, CANADA.

WATER-FEED REGULATOR.

962,735.   Specification of Letters Patent.   Patented June 28, 1910.

Application filed March 25, 1909. Serial No. 485,766.

*To all whom it may concern:*

Be it known that I, WALTER H. BICE, a subject of the King of Great Britain, and a resident of Maple Lodge, in the county of Middlesex, in the Province of Ontario, Canada, have invented a new and useful Water-Feed Regulator, of which the following is a specification.

This invention relates to an apparatus for governing or regulating the feed of the water into the boiler or other receptacle. And this invention consists of a water feed regulator as will be hereinafter fully set forth and described and then pointed out in the claims.

Reference being had to the accompanying drawings forming part of this specification, wherein;—

Figure 1:
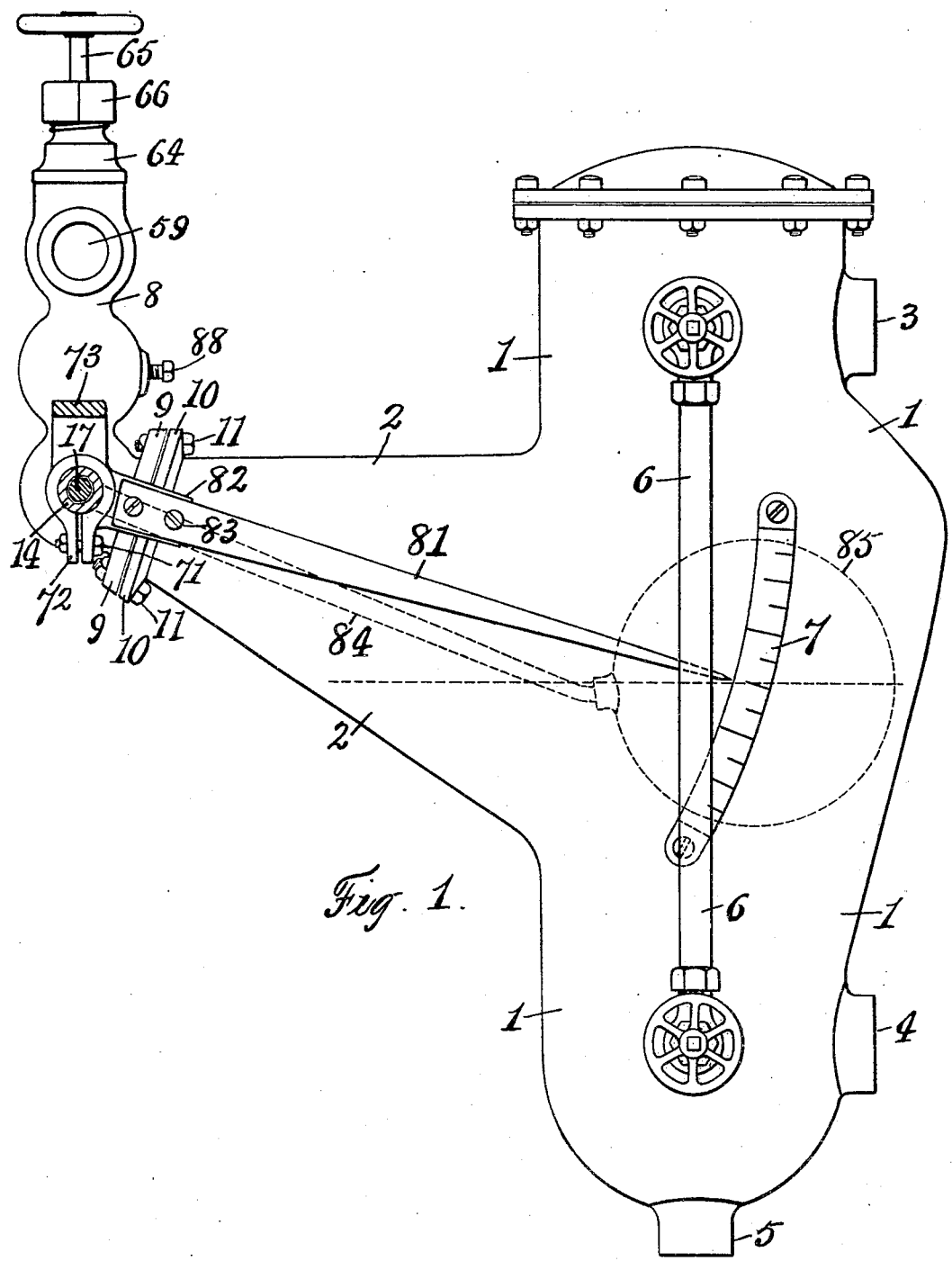
Figure 2:
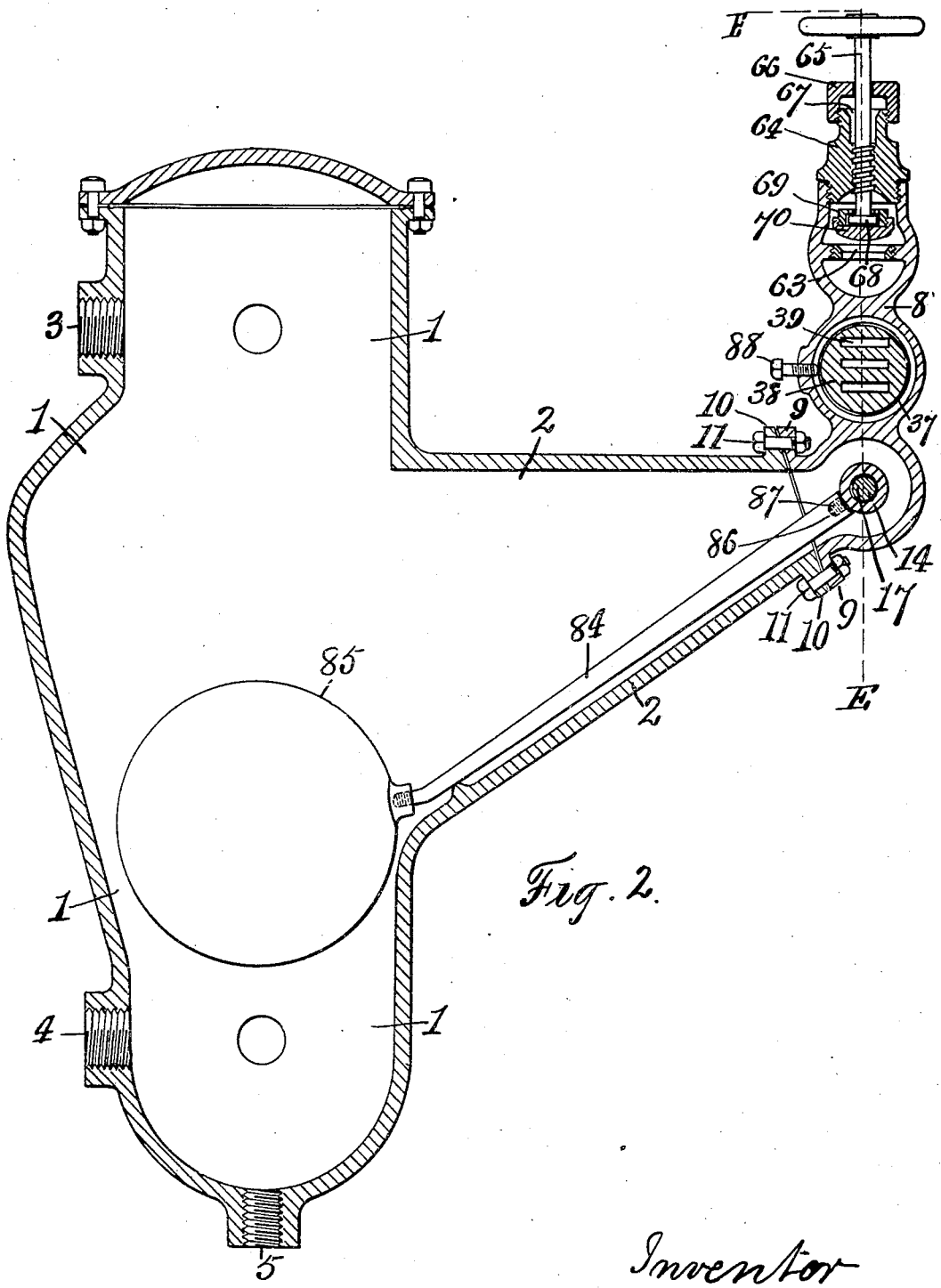

Figure 1 is an outside view of the water column and regulator on the line, A, A of Fig. 3. In this view the water glass, the indicator secured to the arm of the clamp, and the indicator gage are shown. Fig. 2 is a central vertical sectional view of the water column showing the float connected to the sleeve, and a sectional view of the regulator on the line, B, B of Fig. 3. In this view the central valve spindle, the float and float arm are shown in full line. Fig. 3 is an enlarged detail central vertical sectional view of the regulator on the line, E, E of Fig. 2. In this view the valve spindles, the operating spindle, the sliding spindle, and the spring operated spindle are shown in full line. Fig. 4 is a detail sectional view of the regulator on the line, D, D, of Fig. 3. In this view the end valve spindle and sliding spindle are shown in full line. Fig. 5 is a detail end view on the line, C, C of Fig. 3. In this view the arm is shown in section. Fig. 6 is an enlarged detail side view, of the crank and part of the operating spindle, and a sectional view of the sliding spindle showing the arm on the sliding spindle secured to the crank of the operating spindle by a bolt. This view is on the line, F, F, of Fig. 3.

In the drawings the numeral 1 designates the water column, and 2, the branch therefrom, which water column 1 is connected to the boiler, not shown, by the steam connection 3 and the water connection 4, and 5 is the blow off which is sometimes used as a water connection in place of connection 4. The gage glass 6 is connected to the water column in the usual manner, and the indicator gage 7 is also connected to the water column 1. The regulator 8 is connected to and opens into the water column 1 by the flange 9 on the regulator 8 abutting against flange 10 on the branch 2 of the water column 1, and bolts 11 secure the flanges 9 and 10 together.

8 designates the body of the regulator which is provided with the chamber 12, this chamber 12 is provided with the bonnet 13 the latter being screw threaded into said chamber 12 and packing nut 15, as shown.

14 designates the sleeve which is held around the operating spindle 17, and 16 the packing which is held by the packing nut 15 against the bonnet 13, as shown.

17 is the operating spindle secured in place and supported in the sleeve 14, as shown, and in the partition, a, of the chamber 12.

18 is a packing nut which holds the packing 19 against the partition, a, of the chamber 12, and against the operating spindle 17 by screw threads, a screw thread on the outer face of the packing nut 18 engaging with the screw thread on the inner face of the partition, a, as shown.

20 is the chamber provided with the partition, b, and this partition, b, is screw threaded onto the outer face of the bushing 21, as shown, and 22 is a bonnet which is screw threaded and engages with the screw threads on the inner face of the regulator chamber 8 and packing nut, 25 as shown.

23 is a sliding spindle which is held in the bonnet 22 and bushing 21, and 24 is a packing nut the outer face of which is screw threaded and engages with a screw thread on the inner face of the bushing 21, as shown and a packing 26 and 27 respectively, is engaged with by said nuts 24 and 25 to tightly close the space around this sliding spindle 23.

28 is a plug, the outer face of which is screw threaded and engages with a screw thread on the inner face of the chamber 20 to tightly close this chamber 20 by this plug 28.

The operating spindle 17 is provided with a crank 29 and the latter is provided with an enlarged slot 30. The sliding spindle 23 is provided with an arm 31 which extends over the spindle 23, as shown, and 32 is a bolt with an enlarged head 33 which is provided with a nut 34, part of the shank 35 of which is formed larger and works in the enlarged slot 30 and is formed with a shoulder 36 which abuts against the arm 31 of the spindle 23.

37 is the chamber which is divided into two compartments, c, d, by the stationary valve plate 38 and in this stationary valve plate 38 the ports or passages 39 are formed.

40 is an arm provided with an operative valve plate 41 in which the ports or passages 42 are formed.

43 is an annular flange formed in the regulator 8 in which the stationary valve plate 38 is secured.

The arm 40 extends beyond the sliding spindle 23 and said arm is provided with a slot hole 44 which is formed larger in one cross section than the other, and the sliding spindle 23 is provided with nuts 45 and 46 which screw onto the screw threaded end of said sliding spindle 23.

47 is a bonnet, provided with a screw thread on part of the outer face which engages with a screw thread on the adjacent face of the regulator 8, as shown, and the screwing of one into the other tightly closes the opening at the point where the bonnet 47 is secured to the regulator 8.

48 is a pressure plug which is threaded into the bonnet 47, and 49 is a cap nut which is threaded on the pressure plug 48 against the bonnet 47, as shown.

50 is a spring pressure spindle which is formed with an enlarged head 51, and said pressure spindle 50 rests in the bonnet 47 and the pressure plug 48, as shown.

52 is a packing which is inserted and held in place against the pressure plug 48, and between the end of the bonnet 47 and the cap nut 49.

53 is a shoulder formed on the pressure spindle 50, and 54 is a washer which encircles said spindle 50 and abuts against the shoulder 53 at one side.

The spring 55 abuts at one end against the washer 54, and the other end of this spring abuts against the inner shoulder 56 of the pressure plug 48, and at the same time this spring 55 encircles the pressure spindle 50. The pressure spring 55, in its normal condition, holds the pressure spindle 50 against the arm 40 of the operating valve plate 41. The arm 40 is slotted as at 44 and through which extends a spindle 23. The slot 44 extends longitudinally of the arm 40 and the length of the slot is greater than the diameter of the spindle, while the width of the slot is slightly greater than the diameter of the spindle. By this arrangement the arm 40 can be shifted through the action of the spring 55 and head 51 so as to hold the plate 41 against the plate 38 and furthermore to allow plates 38 and 41 to expand and contract which would not be the case if the arm 40 was fixedly secured to the spindle 23.

57 is the water or steam inlet into the chamber 58, and 59 is the water or steam outlet from the chamber 60, and a water or steam outlet and inlet are used according to whether or not a water or steam inlet is used.

In the partition, e, the valve seats 61, 62 and 63 are used for the purposes which will be hereinafter set forth. The regulator 8 has three bonnets 64 which are screw threaded therein, and 65 are the valve spindles each of which are screw threaded into the bonnets 64, as shown. Each of these bonnets 64 have a packing nut 66 which is screw threaded thereon, as shown, and in each of these packing nuts 66 a packing 67 is secured, these nuts 66 therefore hold the packing 67 against the spindle 65, the nuts 66 and the bonnets 64.

68 are the enlargements on the spindles 65, and 69 are the swivel caps one of which is secured on each of the enlargements 68, as shown; and 70 are the valves which are screw threaded on the swivel caps 69, as shown; and said valves 70 are adapted to fit into the valve seats 61, 62 and 63 for the purpose which will be hereinafter set forth.

71 is a bolt which secures the clamp 72 to the sleeve 14, and 73 is the arm of said clamp 72 in which the hole 74 is bored.

75 is the segmental plate which may be keyed or otherwise secured to the spindle 17, and in this segmental plate 75 the teeth 76 are formed.

The hole 74 is formed to receive the worm wheel 77, and 78 is the shaft of this worm wheel 77 which shaft 78 is held in the sides of said arm 73, and said shaft 78 is provided with a hand wheel 79; this worm wheel 77 is therefore adapted to fit in the teeth 76 of the segmental plate 75.

81 is the indicator secured to the projection 82 of the clamp 72 by the screws 83, and the float arm 84 carrying the float 85 is secured to the sleeve 14 by the screw 86 and the bracket 87.

88 is a set screw which extends through the body of the regulator 8 and is adapted to abut against the stationary regulating plate 38 to hold it in the chamber 37 of the regulator 8.

89 is a packing nut which is screw threaded onto the thread of the sleeve 14, as shown, and holds the packing 90 against the spindle 17 and the end of the sleeve 14.

The boiler, not shown, is connected by the steam connection 3 and the water connection 4 with the water column 1, and sometimes by the water connection 5, but the water connection 5 is more often used as a blow off. The gage glass 6 shows the height of the water in the water column, 1, and boiler; and the indicator 81 shows the operation of the float 85, and the indicator gage 7 indicates in the water column the height of the water. The regulator 8 automatically controls the supply of water to the boiler it being connected to the water column 1 and without any possibility of the operative valve plate 41 sticking. The toothed segmental plate 75 is secured to the operating spindle 17, and the worm wheel 77 is supported in the arms 73 and the latter is secured to the sleeve 14. By operating this worm wheel 77 the segmental plate 75 as well as the spindle 17 is operated to give a greater or less flow through the valve plates 38 and 41, by raising and lowering the sliding spindle 23. If the worm wheel 77 is operated, the toothed segment 75 is also operated, this operates the spindle 17 and crank 29 thereon, as shown, in Fig. 6, which is connected to the sliding spindle 23 by a bolt 32 which raises and lowers the sliding spindle 23 so that the ports or passages 42 in the operative valve plate 41 are operated more or less over the openings 39 in the stationary valve plate 38.

It will be noticed that in the application of this improved automatic feed water regulator, it works automatically, it works in a simple, durable and economical manner, it is simple in installation, it is applied to a water column or present connections without mutilation of the boiler, it keeps the water at one level, and gives dry steam, thus effecting a saving in fuel by so doing.

These devices or similar devices may be connected to one another and to a battery of boilers, of the same or different steam pressures, and all fed by the same pump, yet controlling the water level in each, and by opening one valve any boiler may be flooded when desired.

Having thus described my invention, I claim:—

1. In a device of the class described, an operating spindle, means operated by the spindle to control the flow of water to the boiler, a sleeve surrounding part of said spindle, means for operating the sleeve, a clamp secured to said sleeve, an indicator secured to said clamp, an arm secured to said clamp, a worm wheel secured to said arm, in combination with a toothed segment secured to said spindle, and the teeth of said toothed segment engaging with said worm wheel, and operating means for the latter whereby said segment is shifted.

2. A device of the class described comprising a casing provided with a plurality of compartments one arranged above the other, said upper compartment formed with a partition provided with a valve seat, the lower wall of the upper compartment constituting the upper wall of the lower compartment, said lower wall provided with a pair of valve seats adjustable valves adapted to engage the valve seat in the partition and the valve seats in the lower walls whereby communication is closed between both sides of the upper chamber and between the lower and the upper chamber, a stationary and a movable valve plate mounted in the lower chamber and constituting a divisional means to divide said lower chamber into two compartments, and means for adjusting said movable plate with respect to said stationary plate for regulating the flow of water from one of the compartments in the lower chamber to the other compartment of said chamber.

In testimony whereof, I have signed in the presence of the two undersigned witnesses.

WALTER H. BICE.

Witnesses:
P. J. EDMUNDS,
P. PREBBLE.